United States Patent
Alavandi et al.

(10) Patent No.: US 9,346,424 B2
(45) Date of Patent: May 24, 2016

(54) RIGID DEVICE FOR LOW SPEED DAMAGEABILITY OF VEHICLES

(71) Applicant: Ford Global Technologies, LLC, Dearborn, MI (US)

(72) Inventors: Bhimaraddi Venkaraddi Alavandi, Canton, MI (US); Sankar Krishnamoorthy, Northville, MI (US); Rajarathinam Jayachandran, Canton, MI (US); Erika Kristin Low, Ann Arbor, MI (US); Kevin Gustafson, Monroe, MI (US); Matt Alan Niesluchowski, Clarkston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 6 days.

(21) Appl. No.: 14/061,776

(22) Filed: Oct. 24, 2013

(65) Prior Publication Data

US 2015/0115631 A1    Apr. 30, 2015

(51) Int. Cl.
    *B60R 19/04*    (2006.01)
    *B60R 19/18*    (2006.01)
    *B60R 19/24*    (2006.01)
    *B60R 19/34*    (2006.01)

(52) U.S. Cl.
    CPC .............. *B60R 19/04* (2013.01); *B60R 19/18* (2013.01); *B60R 19/24* (2013.01); *B60R 19/34* (2013.01); *B60R 2019/1886* (2013.01)

(58) Field of Classification Search
    CPC ........ B60R 19/34; B60R 19/04; B60R 19/24; B60R 19/18; B60R 2019/1886
    USPC .......................................... 293/120, 133, 108
    See application file for complete search history.

(56) References Cited

U.S. PATENT DOCUMENTS

| | | | | |
|---|---|---|---|---|
| 7,226,097 B2* | 6/2007 | Adachi | ............... | B60R 19/18 |
| | | | | 293/117 |
| 8,770,638 B2* | 7/2014 | Jeong et al. | ............... | 293/133 |
| 2014/0015265 A1* | 1/2014 | Ahn | ............... | 293/133 |

FOREIGN PATENT DOCUMENTS

| | | | |
|---|---|---|---|
| JP | 04287741 A | * | 10/1992 |
| JP | 2011057162 A | | 3/2011 |
| KR | 20110055257 A | | 5/2011 |

* cited by examiner

*Primary Examiner* — Glenn Dayoan
*Assistant Examiner* — Melissa A Black
(74) *Attorney, Agent, or Firm* — Jason C. Rogers; Bejin Bieneman PLC

(57) ABSTRACT

A bumper assembly includes a beam and a rigid device. The beam is at least partially spaced from a vehicle fascia. The rigid device is disposed on the beam in a space defined between the fascia and the beam. The rigid device is configured to transmit and at least partially absorb a force applied to the fascia and limit damage to a rear of the vehicle. The exemplary bumper assembly may further include at least one crush can disposed on the beam. The rigid device is generally aligned with the crush can but on opposing surfaces of the beam.

19 Claims, 4 Drawing Sheets

RIGID DEVICE FOR LOW SPEED DAMAGEABILITY OF VEHICLES

BACKGROUND

Vehicle bumpers are designed to mitigate injury to the passengers or pedestrians and damage to the vehicle following a low-speed collision. The bumpers of modern vehicles are often hidden behind a fascia formed from a soft, plastic material. The fascia provides little, if any, protection to the vehicle during a collision. Even low-speed collisions can require costly repairs if the fascia and bumper are unable to adequately absorb certain impacts, however.

DETAILED DESCRIPTION

An exemplary bumper assembly includes a beam and a rigid device. The beam is at least partially spaced from a vehicle fascia. The rigid device is disposed on the beam in a space defined between the fascia and the beam. The rigid device is configured to principally transmit and at least partially absorb a force applied to the fascia to limit damage to the rear of the vehicle. The exemplary bumper assembly may further include at least one crush can disposed on the beam. The rigid device is generally aligned with the crush can but on opposing surfaces of the beam.

Figure 1:
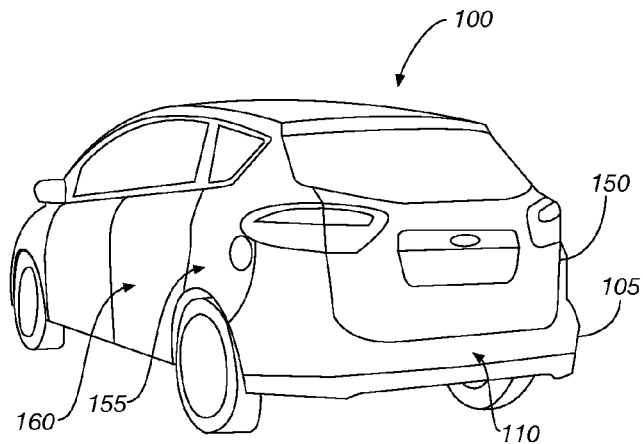
FIG. 1 illustrates a vehicle having an exemplary bumper assembly.

FIG. 1 illustrates an exemplary vehicle 100 having a bumper assembly configured to mitigate damage during low-speed collisions. The system may take many different forms and include multiple and/or alternate components and facilities. While an exemplary system is shown, the exemplary components illustrated are not intended to be limiting. Indeed, additional or alternative components and/or implementations may be used. Moreover, the components illustrated are not necessarily drawn to scale.

As illustrated in FIG. 1, the vehicle 100 includes a rear fascia 105 and a bumper assembly 110. The rear fascia 105 may be formed from, e.g., a plastic material and may be generally located at the rear of the vehicle 100. The fascia 105 may be relatively flexible, and thus, may deform when a force is applied during, e.g., a collision. The bumper assembly 110, as described in greater detail below, may be configured to at least partially absorb impacts.

Figure 2:
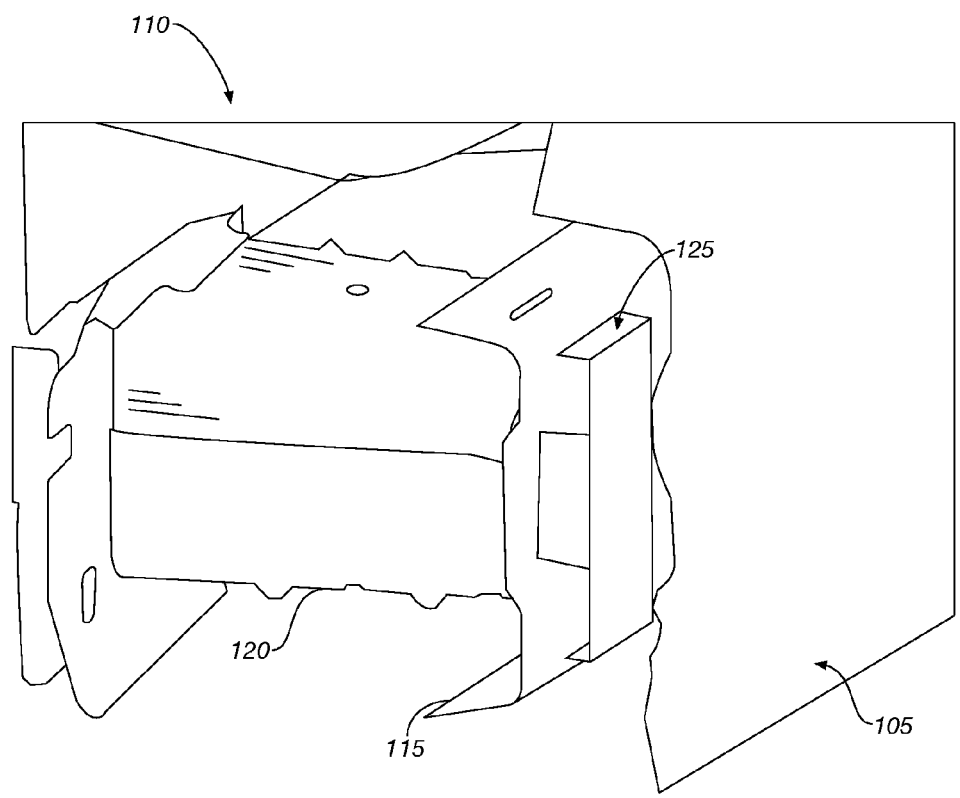
FIG. 2 illustrates one possible arrangement of components of the exemplary bumper assembly of FIG. 1.

Referring now to FIG. 2, the bumper assembly 110 may include a beam 115 at least partially spaced from the fascia 105, a crush can 120 disposed on the beam 115, and a rigid device 125 disposed on the beam 115 in a space defined between the beam 115 and the fascia 105. The rigid device 125 is configured to principally transfer and at least partially absorb a force applied to the fascia 105. In the exemplary approach shown in FIG. 2, the rigid device 125 is disposed on the beam 115 and spaced from the fascia 105. In other possible approaches, however, the rigid device 125 may be disposed on both the beam 115 and the fascia 105 or integrally formed with the beam 115 and/or the fascia 105. In general, the rigid device 125 and the crush can 120 are disposed on opposing surfaces of the beam 115. In other words, the beam 115 is generally disposed between the rigid device 125 and the crush cans 120.

Figure 3:
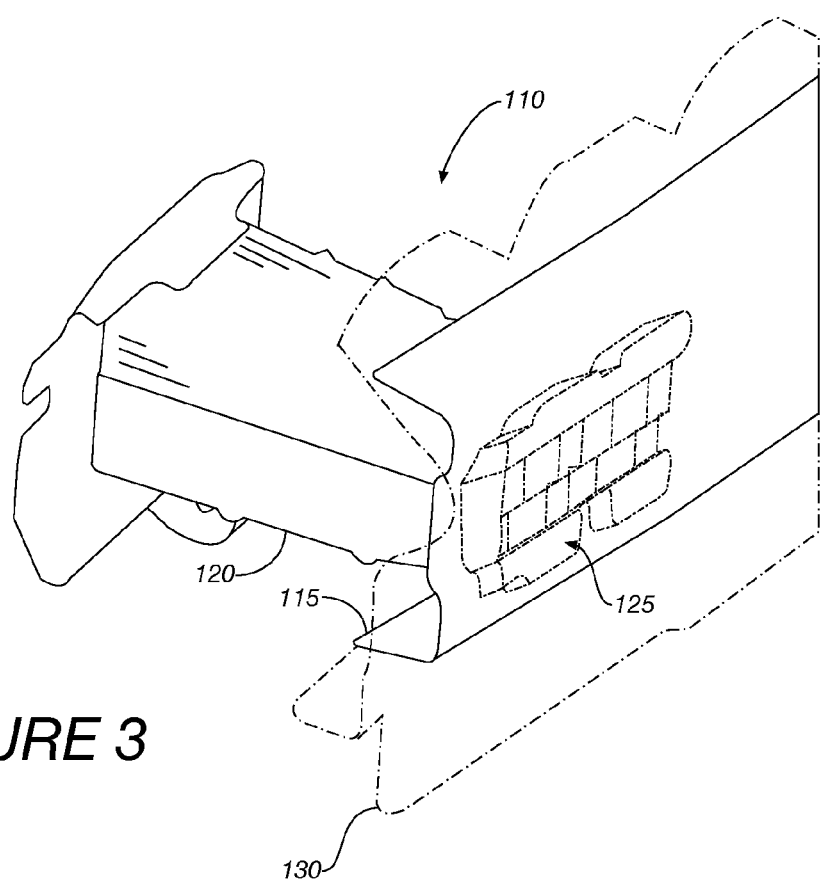
FIG. 3 illustrates another possible arrangement of the components of the exemplary bumper assembly of FIG. 1.

As shown in FIG. 3, the bumper assembly 110 may include an isolator 130 (shown in phantom for purposes of simplicity), and the rigid device 125 may be incorporated into the isolator 130. That is, the isolator 130 may define an opening shaped to receive and support the rigid device 125. Even when generally supported by the isolator 130, the rigid device 125 may still be at least partially disposed on the beam 115 and spaced from the fascia 105, disposed on both the beam 115 and the fascia 105, or integrally formed with the beam 115 and/or the fascia 105.

Figure 4:
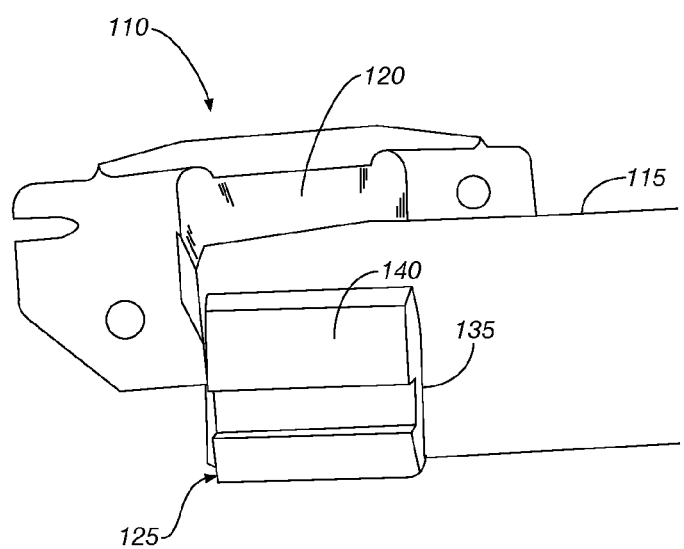
FIG. 4 illustrates an implementation where the rigid device includes a plate.

FIG. 4 illustrates the bumper assembly 110 having a rigid device 125 having a body portion 135 with at least one planar surface 140. The body portion 135 may be arranged on the beam 115 so that the planar surface 140 is contacted by the fascia 105 following an impact. Therefore, the planar surface 140 may extend in a direction that is generally parallel to the beam 115. The rigid device 125 shown in FIG. 4 may be formed from, e.g., a metal material.

Figure 5:
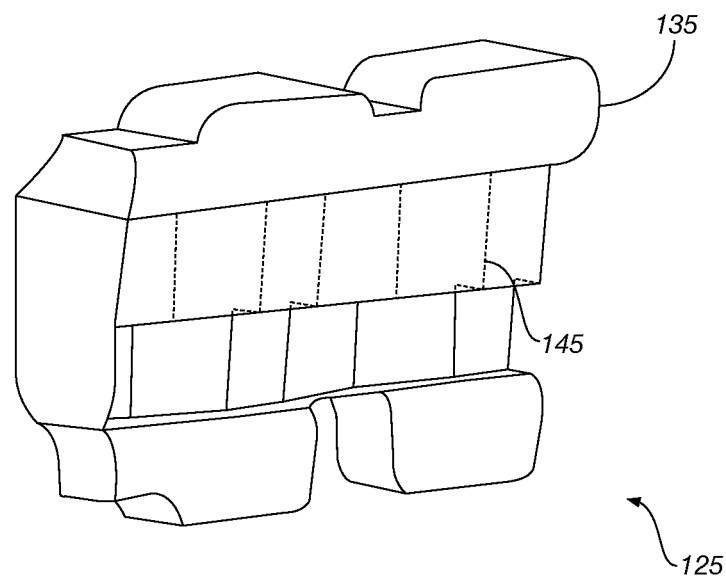
FIG. 5 illustrates an implementation where the rigid device includes a plastic body with fins.

With reference now to FIG. 5, the rigid device 125 may include a body portion 135 and multiple fins 145 that are integrally formed with the body portion 135. The fins 145 may extend in a direction that is generally perpendicular to the beam 115. The fins 145 may increase the strength of the rigid device 125 so that the rigid device 125 may better transmit and at least partially absorb forces from the fascia 105 during low-speed collisions. The rigid device 125 shown in FIG. 5 may be formed from, e.g., a structural, relatively high-strength plastic material such as nylon, a polycarbonate/acrylonitrile Butadiene Styrene (PC/ABS) material, a polyurethane material, or any other known or appropriate material.

Figure 6:
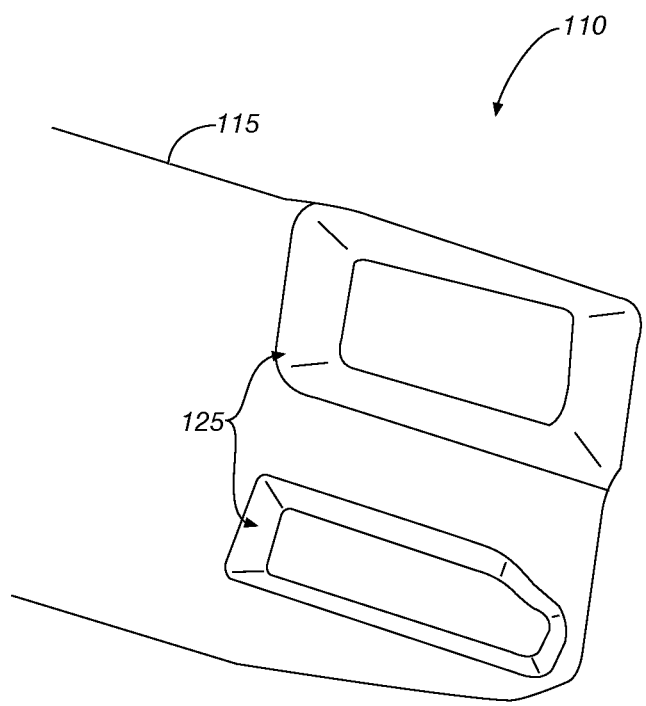
FIG. 6 illustrates the bumper assembly having the rigid device integrally formed with a bumper beam.
Figure 7:
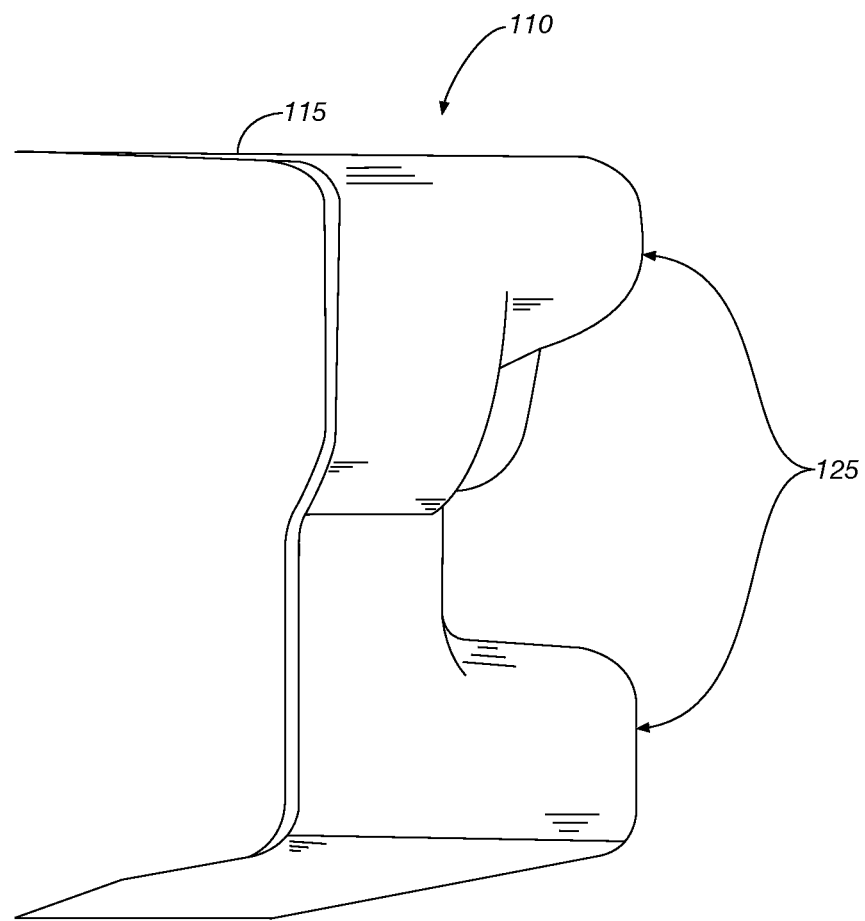
FIG. 7 illustrates a side view of the bumper assembly of FIG. 6.

FIGS. 6 and 7 illustrate an implementation where the rigid device 125 is integrally formed with the bumper beam 115. The rigid device 125 in this implementation is shown as a protrusion defined by the bumper beam 115. The protrusion may be aligned with one of the crush cans 120 (not shown in FIG. 6 for purposes of simplicity).

The rigid devices 125 shown in FIGS. 2-7 will cause the crush can 120 to be engaged by the fascia 105 sooner after a collision than without the rigid device 125. Moreover, the rigid device 125 will transmit and at least partially absorb at least some of the forces applied to the fascia 105. In low-speed collisions, use of the rigid device 125 in the space between the beam 115 and the fascia 105 may mitigate damage to the vehicle 100 during, e.g., low-speed collisions. In particular, the rigid device 125 helps to better manage impact forces in a low-speed rear-end vehicle impact. Low speed vehicle collisions may occur where the impact occurs at speeds of, e.g., 1 to 15 mph or any other "low speed" range defined by a regulatory impact test. The rigid device 125 may absorb a sufficient amount of the impact to limit damage to other part of the vehicle including the rear deck lid or lift gate 150, the side quarter panel 155, and the rear door 160 (see FIG. 1).

The above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bumper assembly comprising:
   a beam at least partially spaced from a rear fascia; and
   a rigid device including a body portion and a plurality of fins integrally formed with the body portion, the rigid device being disposed on the beam in a space defined between the fascia and the beam,
   wherein the plurality of fins are arranged generally perpendicular to the beam and the rigid device is configured to transmit and at least partially absorb a force applied to the rear fascia and limit damage to a rear of the vehicle, and
   wherein the body portion includes at least two rigid protrusions spaced from each other and extending from the beam toward the fascia.

2. The bumper assembly of claim 1, wherein the rigid device is at least partially spaced from the fascia.

3. The bumper assembly of claim 1, wherein the rigid device is disposed on the beam and on the fascia.

4. The bumper assembly of claim 1, wherein the rigid device is integrally formed with at least one of the beam and the fascia.

5. The bumper assembly of claim 1, wherein the rigid device includes a body portion having at least one substantially planar surface.

6. The bumper assembly of claim 1, wherein the rigid device is formed from a metal.

7. The bumper assembly of claim 1, wherein the rigid device is formed from a plastic material.

8. The bumper assembly of claim 1, further comprising at least one crush can disposed on the beam.

9. The bumper assembly of claim 8, wherein the rigid device is generally aligned with the crush can.

10. The bumper assembly of claim 8, wherein the rigid device and the crush can are disposed on opposing surfaces of the beam.

11. A rear impact system comprising:
    a rear deck lid;
    a rear fascia; and
    a bumper assembly having a beam at least partially spaced from the rear fascia and a rigid device including a body portion and a plurality of fins integrally formed with the body portion, the rigid device being disposed on the beam in a space defined between the fascia and the beam, wherein the plurality of fins are arranged generally perpendicular to the beam and the rigid device is configured to transmit and at least partially absorb a force applied to the rear fascia and limit damage to a rear of the vehicle, and
    wherein the body portion includes at least two rigid protrusions spaced from each other and extending from the beam toward the fascia.

12. The rear impact system of claim 11, wherein the rigid device is at least partially spaced from the fascia.

13. The rear impact system of claim 11, wherein the rigid device is disposed on the beam and on the fascia.

14. The rear impact system of claim 11, wherein the rigid device is integrally formed with at least one of the beam and the fascia.

15. The rear impact system of claim 11, wherein the bumper assembly includes at least one crush can disposed on the beam.

16. The rear impact system of claim 15, wherein the rigid device is generally aligned with the crush can.

17. The rear impact system of claim 15, wherein the rigid device and the crush can are disposed on opposing surfaces of the beam.

18. A bumper assembly comprising:
    a beam at least partially spaced from a vehicle fascia; and
    a rigid device including a body portion and a plurality of fins integrally formed with the body portion, the rigid device being disposed on the beam in a space defined between the fascia and the beam,
    wherein the plurality of fins are arranged generally perpendicular to the beam and the rigid device is at least partially spaced from the fascia and is configured to transmit and at least partially absorb a force applied to the fascia and limit damage to a rear of the vehicle
    wherein the body portion includes at least two rigid protrusions spaced from each other and extending from the beam toward the fascia.

19. The bumper assembly of claim 18, further comprising at least one crush can disposed on the beam, wherein the rigid device is generally aligned with the crush can and wherein the crush can and the rigid device are disposed on opposing surfaces of the beam.

* * * * *